United States Patent
Zhao et al.

(10) Patent No.: US 8,836,706 B2
(45) Date of Patent: Sep. 16, 2014

(54) TRIGGERING ANIMATION ACTIONS AND MEDIA OBJECT ACTIONS

(75) Inventors: Jason Xiaobo Zhao, San Jose, CA (US); Jeffrey Chao-Nan Chen, Mountain View, CA (US); Barn-Wan Li, San Jose, CA (US); Runzhen Huang, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 539 days.

(21) Appl. No.: 12/337,656

(22) Filed: Dec. 18, 2008

(65) Prior Publication Data

US 2010/0156911 A1 Jun. 24, 2010

(51) Int. Cl.
*G06T 13/00* (2011.01)
*G06F 3/0481* (2013.01)
*G06F 3/14* (2006.01)

(52) U.S. Cl.
CPC .............. *G06F 3/14* (2013.01); *G06F 3/0481* (2013.01)
USPC ...................................... 345/473

(58) Field of Classification Search
None
See application file for complete search history.

(56) References Cited

U.S. PATENT DOCUMENTS

| | | | |
|---|---|---|---|
| 5,889,514 A | 3/1999 | Boezeman et al. | |
| 6,396,500 B1 | 5/2002 | Qureshi et al. | |
| 6,696,500 B2 | 2/2004 | Hata et al. | |
| 6,701,014 B1 | 3/2004 | Syeda-Mahmood | |
| 6,904,561 B1 | 6/2005 | Faraday et al. | |
| 7,336,280 B2 * | 2/2008 | Nelson et al. | 345/473 |
| 2002/0140719 A1 * | 10/2002 | Amir et al. | 345/716 |
| 2004/0012594 A1 * | 1/2004 | Gauthier et al. | 345/473 |
| 2004/0255337 A1 | 12/2004 | Doyle et al. | |
| 2005/0044499 A1 | 2/2005 | Allen et al. | |
| 2006/0022983 A1 * | 2/2006 | Gauthier et al. | 345/473 |
| 2006/0103655 A1 | 5/2006 | Nelson et al. | |
| 2006/0129933 A1 * | 6/2006 | Land et al. | 715/723 |
| 2007/0013699 A1 | 1/2007 | Nelson et al. | |
| 2007/0262996 A1 * | 11/2007 | Fernandez et al. | 345/473 |
| 2010/0162152 A1 | 6/2010 | Allyn et al. | |

FOREIGN PATENT DOCUMENTS

| | | | |
|---|---|---|---|
| CN | 1776672 A | 5/2006 | |
| CN | 101127870 A | 2/2008 | |
| JP | 10-031664 A | 2/1998 | |
| WO | 2007043826 A1 | 4/2007 | |
| WO | 2007043831 A1 | 4/2007 | |
| WO | 2008016853 A2 | 2/2008 | |

OTHER PUBLICATIONS

"International Search Report", Mailed Jun. 22, 2010, Application No. PCT/US2009/064432, pp. 1-13.

(Continued)

*Primary Examiner* — Hau Nguyen
*Assistant Examiner* — Ryan M Gray
(74) *Attorney, Agent, or Firm* — Jim Ross; Micky Minhas

(57) ABSTRACT

A request may be received to trigger an animation action in response to reaching a bookmark during playback of a media object. In response to the request, data is stored defining a new animation timeline configured to perform the animation action when playback of the media object reaches the bookmark. When the media object is played back, a determination is made as to whether the bookmark has been encountered. If the bookmark is encountered, the new animation timeline is started, thereby triggering the specified animation action. An animation action may also be added to an animation timeline that triggers a media object action at a location within a media object. When the animation action is encountered during playback of the animation timeline, the specified media object action is performed on the associated media object.

8 Claims, 9 Drawing Sheets

(56) References Cited

OTHER PUBLICATIONS

"Slideshow Software 4.2.0", Retrieved at<<http://www.eurodownload.com/download-software/1179/Slideshow-software.html>>, Oct. 13, 2008, pp. 1-7.

"PresenterSoft MediaEasy 2.6.53", Retrieved at<<http://presentersoft-mediaeasy.presentersoft-inc.qarchive.org/>>, Oct. 13, 2008, pp. 1-2.

Hendrickson Mark,"Omnisio Syncs Slides with Video Presentations", Retrieved at<<http://www.techcrunch.com/2008/05/13/omnisio-syncs-slides-with-video-presentations/>>, May 13, 2008, pp. 1-8.

"Synchronizing Video Content with Slides", Retrieved at<<http://docs.cyberlink.com/english/products/streamauthor/tutorials/file_studio/synchronize_indepth.jsp>>, Oct. 13, 2008, pp. 1-2.

"Capturing and Synchronizing Slides with WMV", Retrieved at<<http://www.cs.washington.edu/education/dl/tools/wmv_slide_sync/>>, Oct. 13, 2008, pp. 1-3.

Chilean Official Action dated Sep. 28, 2012 in Chilean Application No. 2011-001465.

Chinese Official Action dated Sep. 26, 2012 in Chinese Application No. 200980151930.4.

European Search Report dated Feb. 2, 2013 in European Application No. 09837775.7.

Chinese Official Action dated Apr. 23, 2013 in Chinese Application No. 200980151930.4.

Russian Office Action dated Nov. 1, 2013 in Russian Application No. 2011124896.

Chilean Official Action dated Jan. 25, 2013 in Chilean application No. 1465-2011.

Mexican Official Action dated May 29, 2013 in Mexican Application No. MX/a/2011/006437.

Chinese Official Action dated Oct. 17, 2013 in Chinese Application No. 200980151930.4.

Japanese Office Action dated Oct. 17, 2013 in Japanese Application No. 2011-542179.

Australian Official Action dated Mar. 23, 2014 in Australian Application No. 2009336090.

Russian Patent No. 2327218 C2 in the name of Mehtt et al., published Jun. 20, 2008, entitled "Creation and Execution of Animation Mode for Graphical User Interface".

Russian Notice of Allowance dated Jun. 26, 2014 in Russian Application No. 2011124896.

* cited by examiner

TRIGGERING ANIMATION ACTIONS AND MEDIA OBJECT ACTIONS

BACKGROUND

Electronic presentation application programs allow users to create high-impact dynamic slide presentations that include text, graphics, media objects, and other types of objects. Some presentation applications even provide functionality for animating the objects on a slide. Animating objects in a slide presentation can be a powerful way to attract and focus the attention of an audience. For instance, it may be possible to animate text, graphics, diagrams, charts, and media objects, such as audio or video files, to focus an audience on important points in a presentation, to control the flow of information in the presentation, and to add visual flair to the presentation.

In addition to providing functionality for animating objects, some previous presentation applications also provide functionality for playing media objects within a slide presentation. For instance, an audio or video file may be inserted onto a slide and played back when the slide is displayed. However, previous presentation applications provide little or no integration between animation actions defined for objects on a slide and the playback of media objects. As an example, in order to synchronize the start of an animation action with respect to a point of interest in an audio or video file, a user must manually adjust the start of the animation action to coincide with the point of interest. This, however, can be a frustrating and time-consuming process for presentation application program users.

It is with respect to these considerations and others that the disclosure made herein is presented.

SUMMARY

Technologies are described herein for triggering animation actions and media object actions. In particular, through the utilization of the concepts and technologies presented herein, the start of animation actions can be easily synchronized to locations within a media object such as an audio or video file. In this way, the playback of a media object can trigger the start of animation actions in an animation timeline. Moreover, animation actions can also be defined on the animation timeline that trigger media object actions with respect to media objects. For instance, animation actions can be defined in the animation timeline that can cause playback of a media object to begin, pause, or stop at a specified location.

In one embodiment, a user interface and associated functionality are provided for defining and executing a forward trigger. A forward trigger starts an independent animation action in response to reaching a specified location during the playback of a media object. In order to define a forward trigger, a particular point of interest in a media object may be defined as a bookmark. A request may then be received to trigger an animation action in response to reaching the bookmark during playback of the media object. In response to such a request, data is stored that defines a new animation timeline that is configured to perform the specified animation action when playback of the media object reaches the bookmark. Any type of animation action may be specified on any type of object.

When the media object is played back, a determination is made as to whether the bookmark has been encountered. If the bookmark is encountered during playback of the media object, the new animation timeline is started, thereby triggering the specified animation action. In order to perform the animation action, the data defining the new animation timeline may be transformed in order to provide an appropriate visual depiction of the animation action on a display of a computing system. In this manner, playback of a media object can trigger animation actions when points of interest in the media object are reached.

In another embodiment, a user interface and associated functionality are provided for defining and executing a reverse trigger. A reverse trigger starts a media object action, such as play, pause, or stop, with respect to a media object from an animation timeline. In order to define a reverse trigger, a request is received to add an animation action to an animation timeline with respect to a media object. The animation action is configured to trigger a media object action at a specified location within the media object. For instance, the media object action might start playback of the media object at a bookmark, might stop playback of the media object at a bookmark, or might pause playback of the media object at a bookmark.

Once the reverse trigger has been defined, a corresponding animation action is added to an animation timeline. When the animation action is encountered during playback of the animation timeline, the specified media object action is performed on the associated media object. In this manner, an animation timeline can stop, start, or pause playback of a media object at specific points of interest. Other types of media object actions may also be performed.

It should be appreciated that forward triggers and reverse triggers may be combined in order to branch multiple animation timelines from a media object timeline and to allow each of the branched timelines to communicate with other timelines. It should also be appreciated that the above-described subject matter may be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
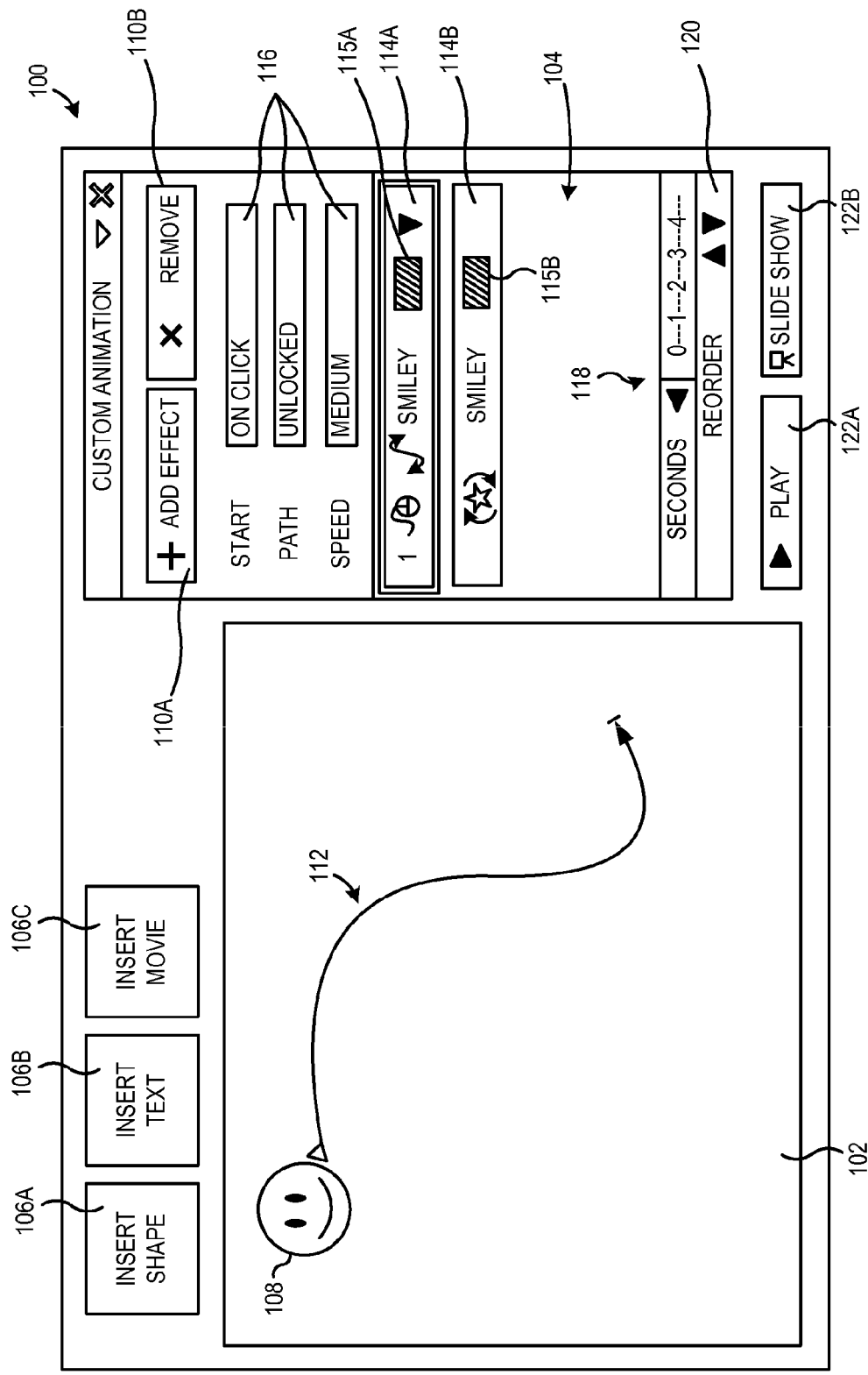
FIG. 1 is a user interface diagram showing one illustrative user interface for defining animation actions.

The following detailed description is directed to concepts and technologies for triggering animation actions and media object actions. While the subject matter described herein is presented in the general context of program modules that execute in conjunction with the execution of an operating system and application programs on a computer system, those skilled in the art will recognize that other implementations may be performed in combination with other types of program modules.

Generally, program modules include routines, programs, components, data structures, and other types of structures that perform particular tasks, implement particular abstract data types, and transform data. Moreover, those skilled in the art will appreciate that the subject matter described herein may be practiced with or tied to other specific machines, computer system configurations, including hand-held devices, multi-processor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, technologies for triggering animation actions and media object actions will be described.

Turning now to FIG. 1, details will be provided regarding an illustrative user interface 100 provided by an application program for defining an animation sequence. The user interface 100 illustrated in FIG. 1 is provided by a presentation application in one embodiment, such as the POWERPOINT presentation application from MICROSOFT CORPORATION of Redmond, Wash. It should be appreciated, however, that the embodiments presented herein may be utilized with other presentation applications from other manufacturers and with other types of software applications that provide functionality for the creation and playback of animation sequences.

As shown in FIG. 1, the user interface 100 includes a canvas 102 in one embodiment. A user may insert objects onto the canvas 102 and define animation actions to be applied to the objects to create an animation sequence. Objects that may be placed on the canvas 102 may include static objects like shapes, text, clip art, and images, and media objects like movies and audio files. The user interface buttons 106A-106C may be selected to thereby allow a user to specify a shape, text, or movie, respectively, to be placed on the canvas 102. In the example shown in FIG. 1, a shape 108 has been placed onto the canvas 102. It should be appreciated that virtually any number of objects may be placed on the canvas 102 and animated in the manner described herein.

Once an object has been placed onto the canvas 102, one or more animation actions, which may be referred to herein as "animations," may be defined with respect to the object. In one implementation, the user interface button 110A may be selected to view a list of the available animation actions that may be applied to an object and to select one of the available animation actions. In the example shown in FIG. 1, a motion animation action has been selected for use with the object 108 that will cause the object 108 to move along the motion path 112 when the animation action is played. A second animation action has also been selected for use with the object 108 that will cause the object 108 to spin while it is animated along the motion path 112. Virtually any number of animation actions may be applied to an object. Animation actions include, but are not limited to, operations that cause an object to spin, fade in, fade out, move across the canvas 102, split, descend, ascend, expand, or change color.

According to one implementation, a user interface is also provided that allows a user to define the order and timing for the specified animation actions. For instance, in one embodiment the user interface 100 includes an event list 104 that shows a time-ordered list of the animation actions that have been assigned to objects on the canvas 102. Each of the items 114A-114B in the event list 104 represents an individual animation action and graphically conveys information regarding the type of animation action, the manner in which it will play back, and its start, end, and duration. In order to signify the start, end, and duration of each of the items 114A-114B, each of the items 114A-114B in the event list 104 may include an event timeline bar 115A-115B, respectively, that is correlated with a universal timeline 118.

According to one implementation, the items 114A-114B in the event list 104 are logically related to each other. These logical relationships may be used to build a sequence of animation actions, which may be referred to herein as an animation sequence. A user may define the logical relationships between the items 114A-114B during the creation of an animation sequence and are used to determine when each animation action should be launched. Exemplary logical relationships include "start with previous," "start after previous," and "start on click." The "start with previous" logical relationship allows an animation action to start at the same time as a previous event in the event list 104. The "start after previous" logical relationship will cause an animation action to start after the completion of an immediately previous action or group of actions identified by items 114A-114B in the event list 104. The "start on click" logical relationship will cause an animation action to be initiated when a mouse click, or other suitable user input, has been received.

An appropriate user interface may be provided that allows the user to specify the desired logical relationship for each item in the event list 104. For instance, in one embodiment the fields 116 permit a user to define the logical relationship, path, and speed for a selected item 114A in the event list 104. Other types of user interfaces may also be provided for defining the logical relationships between animation actions. An icon or other type of visual indicator may also be displayed within each of the items 114A-114B in the event list 104 indicating the type of logical relationship that has been defined for that item.

In another embodiment, a "start on trigger" logical relationship can be defined to start an animation action when a triggering event has been detected, thereby producing an event-driven animation sequence. For instance, a user could use this functionality to specify that an object move onto the canvas 102 if another object on the canvas 102 is clicked. Additional details regarding other types of triggers disclosed herein are provided below with respect to FIGS. 2-8.

In one embodiment, an advanced event timeline view is provided in conjunction with the event list 104. This advanced event timeline view may be activated by a user by selecting an item within a context-sensitive menu associated with one of the items 114A-114B in the event list 104. The advanced event timeline view graphically shows the timing relationships between animation actions. More specifically, the event timeline bars 115A-115B are displayed, respectively, for each item 114A-114B in the event list 104. The event timeline bars 115A-115B are correlated to the universal timeline 118. The event timeline bars 115A-115B graphically depict the start time, end time, and duration for each item 114A-114B shown in the event list 104.

According to one embodiment, a user can select, drag, and drop the event timeline bars 115A-115B with a mouse or other computer input device to set the timing of each associated animation action. For instance, if a users selects and drags a left edge of an event timeline bar 115A with an input device, the start time of the corresponding animation action will be moved either earlier or later in time with respect to the universal timeline 118, depending on the direction the left edge is dragged. If a user selects and drags a right edge of an event bar 115A, this will move the end time of the corresponding animation action either earlier or later in time with respect to the universal timeline 118. The start time, stop time, and duration of the corresponding animation action can be defined by graphically modifying the start and stop times in this manner. Additionally, if a user selects and drags an entire event timeline bar 115A with an input device, this action will move the entire event either later or earlier in time with relation to the universal timeline 118, while maintaining its duration.

It should be appreciated that various other methods may be utilized to manipulate the event timeline bars 115A-115B of the event list 104. For instance, a user can change the order in which animation actions are played back by selecting an animation item 114A in the event list 104 with a mouse cursor or other computer input device and dragging it up or down within the list 104. Alternatively, a user may select one of the items 114A-114B and then select one of the user interface buttons 120 for moving the selected item up or down in the list 104. A user can also delete an item from the event list 104 by selecting one of the items 114A-114B to be deleted and then selecting the user interface button 110B. In response, the selected item will be deleted from the event list 104. The corresponding animation action will also be removed from the canvas 102 and the respective object.

In one embodiment, a user may select the user interface button 122A to playback the defined animation while still displaying the event list 104 and the universal timeline 118. During playback, the universal timeline 118 is shown moving forward in time and the animation actions defined by the items 114A-114B in the event list 104 are generated in order as a current time marker (not shown) reaches the start of each event timeline bar 115A-115B. A user may be permitted to pause the animation playback and directly manipulate the event timeline bars 115A-115B by dragging their start or end times. The user can also check the event timeline bar timings by "scrubbing" (moving within the universal timeline 118 to locate a particular time) the current time marker. This process allows a user to obtain quick feedback as to the current arrangement of animation actions. Selection of the user interface button 122B will cause the animation sequence defined by the items 114A-114B in the event list 104 to be played back full screen.

It should be appreciated the user interface 100 illustrated in FIG. 1 and described above may include additional functionality not described herein. Such additional functionality is set forth in U.S. Pat. No. 6,904,561, filed on Jul. 19, 2001 and entitled "INTEGRATED TIMELINE AND LOGICALLY-RELATED LIST VIEW," which is assigned to the assignee of the instant patent application and expressly incorporated by reference herein in its entirety.

Figure 2:
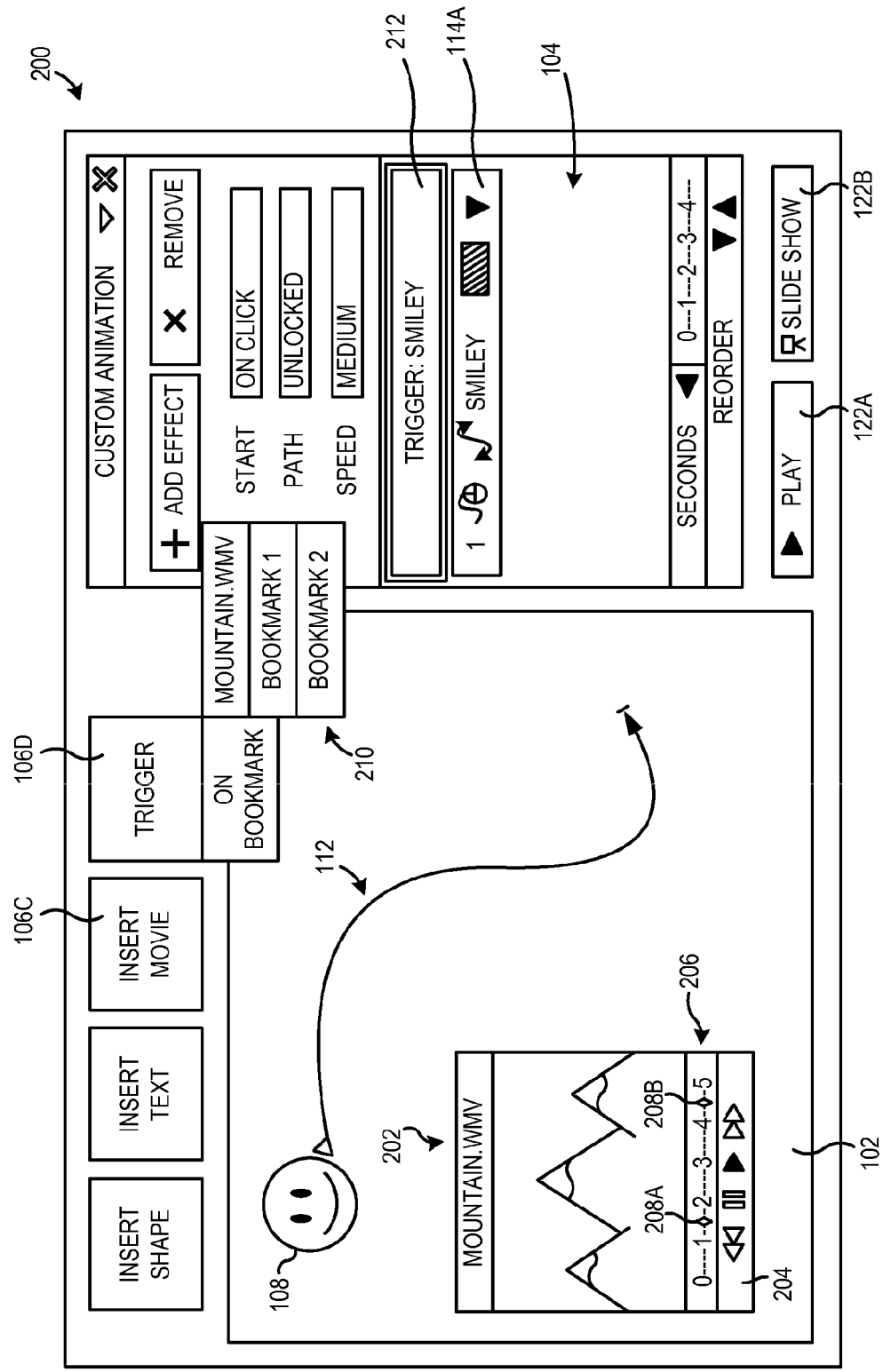
FIGS. 2-3 are user interface diagrams showing several illustrative user interfaces provided herein for defining a forward triggered animation.

FIG. 2 shows a user interface 200 provided in one embodiment for defining a forward trigger. As discussed briefly above, a forward trigger starts an independent animation action in response to reaching a specified location during the playback of a media object. In order to define a forward trigger, a media object must first be placed on the canvas 102. As also discussed briefly above, a media object may comprise an audio file, a video file, or another type of file that includes an audio and/or visual component and that may be played back over time. In the example shown in FIG. 2, a video file 202 has been inserted on the canvas through the selection of the button 106C and an appropriate user interface (not shown) for selecting the video file to be inserted.

As shown in FIG. 2, transport controls 204 may be displayed with respect to the video file 202. The transport controls 204 allow a user to play, pause, fast forward, or reverse the playback of the video file 202. A media object timeline 206 may also be displayed with respect to the video file 202 that indicates the current location of playback within the video file 202. According to one embodiment, an appropriate user interface may also be provided for defining one or more locations within the video file 202 as points of interest, or bookmarks. For instance, a user may mouse click or double mouse click on the media object timeline 206 in one embodiment to create new bookmarks. In the example shown in FIG. 2, two bookmarks 208A-208B have been defined for the video file 202. As will be discussed in greater detail below, the bookmarks 208A-208B may be utilized as forward triggers for triggering animation actions.

Once one or more bookmarks have been defined with respect to a media object, a forward trigger may be defined. In the embodiment shown in FIG. 2, a forward trigger is defined by selecting an item 114 corresponding to the animation action that should be triggered by a media object in the event list 104. In the illustrative example shown in FIG. 1, the item 114A corresponding to the motion path animation action has been selected. Once the item 114A has been selected, a user interface button 106D is made active which, when selected, will display a drop down menu 210 that includes selectable items corresponding to the bookmarks that have been defined with respect to the video file 202 and any other media objects that have been placed on the canvas 102.

An appropriate user input device may be utilized to select one of the items within the drop down menu 210. The selection comprises a request to trigger the animation action selected in the event list 104 in response to reaching the bookmark selected from the drop down menu 210 during playback of the video file 202. In response to receiving a selection from the drop down menu 210, data is stored that defines a new animation timeline that is configured to perform the selected animation action when playback of the video file 202 reaches the selected bookmark. In the example shown in FIG. 2, an identifier 212 has also been inserted into the event list 104 indicating that a forward trigger has been defined with respect to the shape 108.

When the video file 202 is played back, a determination is made as to whether the bookmark selected from the drop down menu 210 has been encountered. If the selected bookmark is encountered during playback of the video file 202, the new animation timeline is started, thereby triggering the specified animation action. In order to perform the animation action, the data defining the new animation timeline may be transformed in order to provide an appropriate visual display on a computing system. In this manner, playback of a video file 202 can trigger animation actions when bookmarks 208A-208B in the video file 202 are reached.

It should be appreciated that the user interface controls shown in the FIGURES presented herein are merely illustrative and that other types of user interface controls and input schemes may be utilized to embody the concepts presented herein. It should also be appreciated that the particular layout and organization of user interface controls presented herein is also illustrative and that many other layouts may be utilized to embody the technologies and concepts presented herein.

Figure 3:
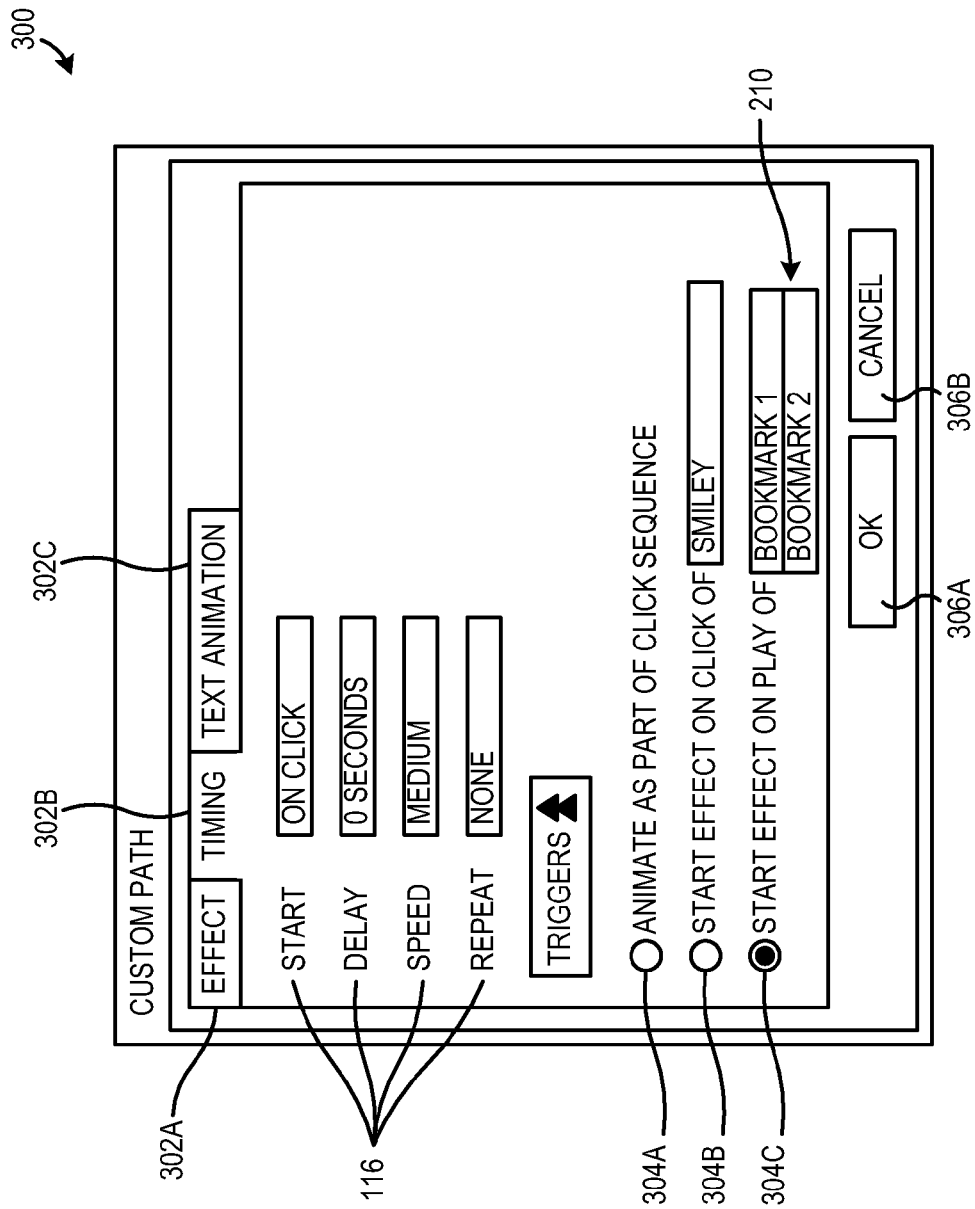

Referring now to FIG. 3, one user interface 300 that may be utilized in another embodiment to define a forward trigger will be described. In this embodiment, the user interface 300 is displayed in response to the selection of an appropriate menu item from a pull down menu associated with the item 114A in the event list 104 for which a forward trigger is to be defined. Other user interfaces may be provided for accessing the user interface 300 shown in FIG. 3.

In the implementation shown in FIG. 3, the user interface 300 includes three user interface tabs 302A-302C which, when selected, provide user interfaces for specifying various options with respect to the selected animation action. Selection of the tab 302A exposes a user interface (not shown) for specifying customizations for the selected animation action. Selection of the tab 302C exposes a user interface (not shown) for specifying various options relating to the animation of text. Selection of the tab 302B exposes the user interface shown in FIG. 3 that allows a user to specify options relating to the timing of the selected animation action, including the definition of a forward trigger with respect to the selected animation action.

As shown in FIG. 3, the user interface 300 includes several fields 116 for specifying various options relating to the timing of the animation action corresponding to the selected item 114A in the event list 104. The user interface 300 also includes the user interface controls 304A-304C for specifying a trigger with respect to the selected animation action. The user interface control 304A allows a user to specify that the selected animation action be triggered as a part of a click sequence. The user interface control 304B allows a user to specify that the selected animation action be triggered in response to a mouse click received with respect to an object on the canvas 102. The user interface control 304C allows a user to specify that the selected animation action be forward triggered.

If the user interface control 304C is selected, thereby requesting that the selected animation action be triggered when a media object reaches a particular bookmark, the user interface control 210 becomes active. Through the user interface control 210, a user can select the particular bookmark that should trigger the animation action corresponding to the selected item 114A in the event list 104. The user may then select the user interface control 306A to accept the changes made to the user interface 300 or may select the user interface control 306B to cancel the changes.

Figure 4:
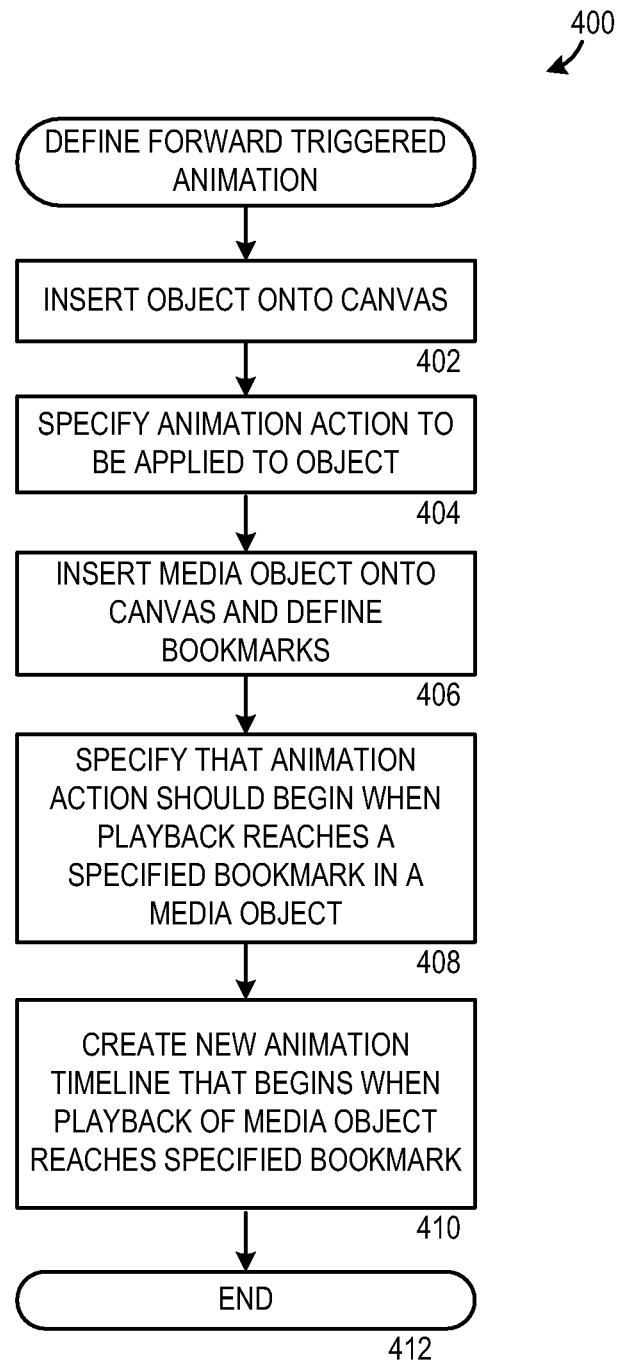
FIGS. 4-5 are flow diagrams showing illustrative processes for defining and executing, respectively, a forward triggered animation in one embodiment presented herein.

Referring now to FIG. 4, additional details will be provided regarding the embodiments presented herein for forward triggering an animation action. In particular, FIG. 4 is a flow diagram showing a routine 400 that illustrates aspects of the operation of an application program in one implementation for defining a forward trigger with respect to an animation action.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 400 begins at operation 402, where an object, such as the shape 108, is inserted onto the canvas 102. Once an object has been placed on the canvas 102, the routine 400 proceeds to operation 404, where an animation action is defined with respect to the object. For instance, in the example described above with respect to FIGS. 1-2, a motion path 112 has been defined with respect to the shape 108. Definition of an animation action causes an item 114 to be placed into the event list 104 corresponding to the animation action.

From operation 404, the routine 400 proceeds to operation 406 where a media object, such as the video file 202, is placed onto the canvas and where one or more bookmarks 208 are defined with respect to the media object. Once the bookmarks have been defined, the routine 400 proceeds to operation 408, where user input is received that specifies that the animation action should begin when playback of the media object reaches a specified bookmark. Several illustrative user interfaces were described above with respect to FIGS. 2-3 for specifying the bookmark that should be utilized as the forward trigger for the selected animation action.

From operation 408, the routine 400 proceeds to operation 410, where a new animation timeline is created that is configured to perform the animation action when the playback of the media object reaches the specified bookmark. As will be described in greater detail below, a determination is made during the playback of the media object as to whether the bookmark has been reached. If so, the specified animation action is performed. For instance, in one embodiment the animation action is performed by transforming the data defining the new animation timeline to a visual depiction for display by a computer system. From operation 410, the routine 400 proceeds to operation 412, where it ends.

Figure 5:
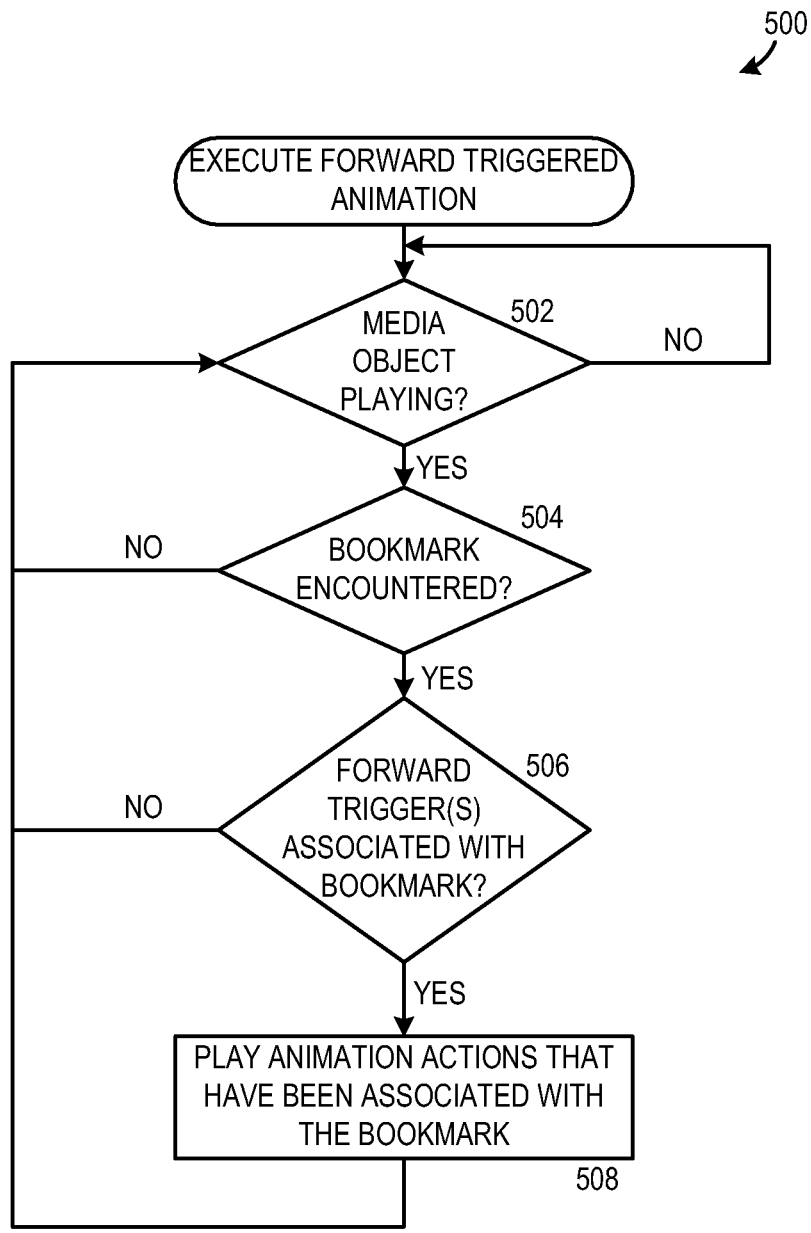

Referring now to FIG. 5, additional details will be provided regarding the embodiments presented herein for executing a forward trigger. In particular, FIG. 5 is a flow diagram showing a routine 500 that illustrates aspects of the operation of an application program for executing a forward triggered animation in one implementation presented herein. The routine 500 begins at operation 502, where the application program determines whether a media object is playing. If not, the routine 500 returns to operation 502, where another such determination is made.

If, at operation 502, it is determined that a media object is playing, the routine 500 proceeds to operation 504. At operation 504, a determination is made as to whether a bookmark has been encountered during playback of the media object. If no bookmark has been encountered, the routine 500 returns to operation 502, described above. If a bookmark is encountered during playback of the media object, the routine 500 proceeds to operation 506. At operation 506, a determination is made as to whether any forward triggers have been associated with the bookmark in the manner described above with respect to FIG. 4. If no forward triggers are associated with the bookmark, the routine 500 returns to operation 502, described above.

If, at operation 506, it is determined that the bookmark has forward triggers associate with it, the routine 500 proceeds to operation 508. At operation 508, the animation action, or actions, associated with the bookmark are played back. As discussed above, the animation action may be performed by transforming data defining the new animation timeline to a visual depiction for display by a computer system. From operation 508, the routine 500 returns to operation 502, described above.

Figure 6:
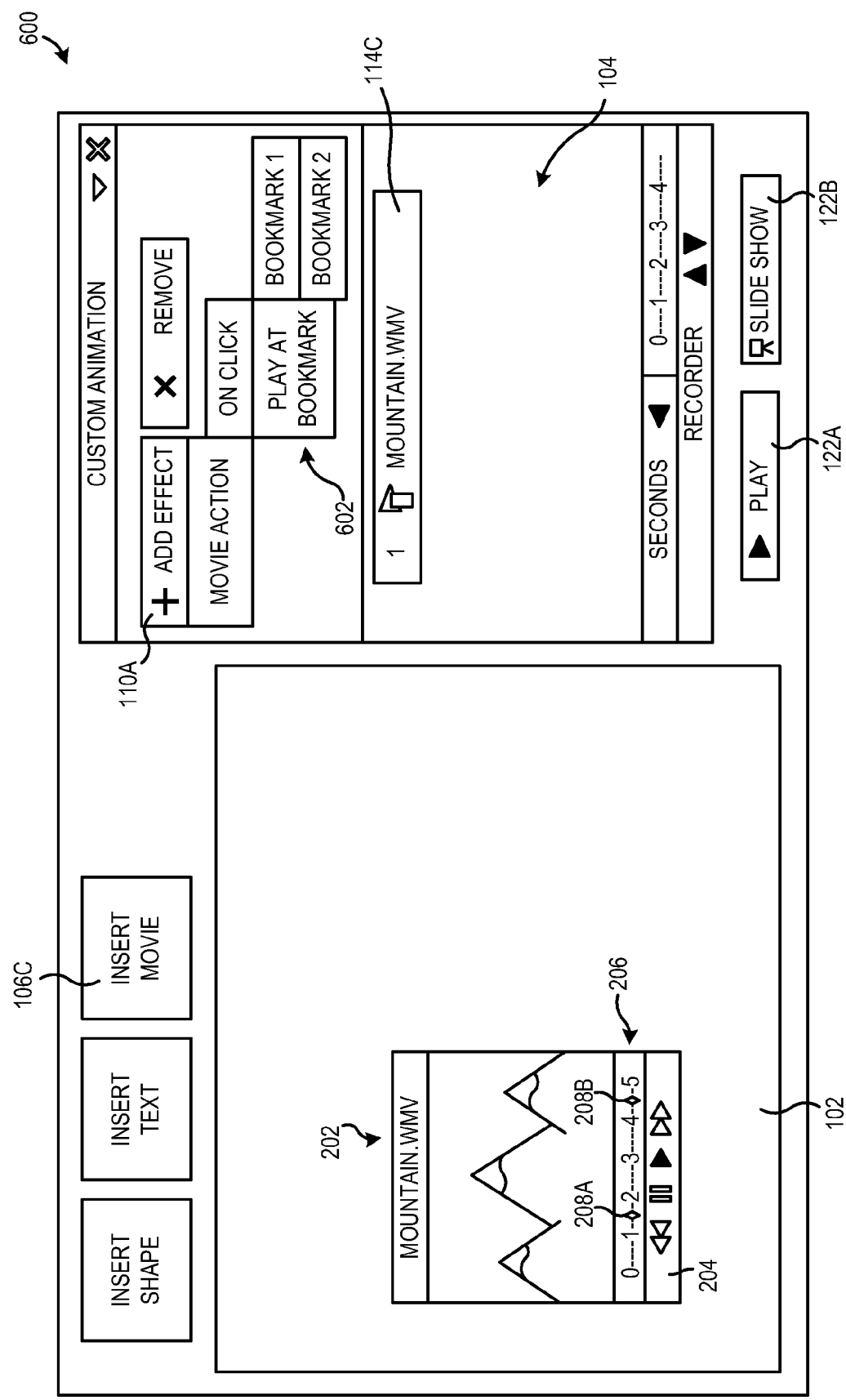
FIG. 6 is a user interface diagram showing one illustrative user interface provided herein for defining a reverse triggered animation.

Turning now to FIG. 6, one illustrative user interface provided herein for defining a reverse triggered animation will be described. As described briefly above, a reverse trigger starts a media object action, such as play, pause, or stop, with respect to a media object from an animation timeline. The animation action is configured to trigger a media object action at a specified location within the media object.

In order to define a reverse trigger, a request is received to add an animation action to an animation timeline with respect to a media object. For instance, in the example shown in FIG. 6, the video file 202 has been inserted on the canvas 102 through the selection of the button 106C and an appropriate user interface (not shown) for selecting the video file to be inserted. Several bookmarks 208A-208B have also been defined through an appropriate user interface with respect to the video file 202.

In order to define a new reverse trigger, a user interface is provided in response to the selection of the user interface button 110A. In particular, a drop down menu 602 is provided in one embodiment through which a user can select the operation to be performed by the reverse trigger and the bookmark at which the operation should occur. For instance, the drop down menu 602 in FIG. 6 identifies a media object action that starts playback of the video file 202 at a specified bookmark. The drop down menu 602 might also identify media object actions for stopping playback of the video file 202 at a bookmark, pausing playback of the video file 202 at a bookmark, or performing another type of action with respect to the media object at the specified bookmark.

Once the reverse trigger has been defined through the drop down menu 602, a corresponding animation action is added to an animation timeline. For instance, in one embodiment, a new item 114C is added to the event list 104 corresponding to the new reverse trigger. When the animation action is encountered during playback of the animation timeline, the specified media object action is performed on the associated media object. For instance, in the example shown in FIG. 6, playback of the video file 202 will begin at the selected bookmark when the item 114C is encountered. In this manner, an animation timeline can stop, start, or pause playback of a media object at specific points of interest. Other types of media object actions may also be performed.

Figure 7:
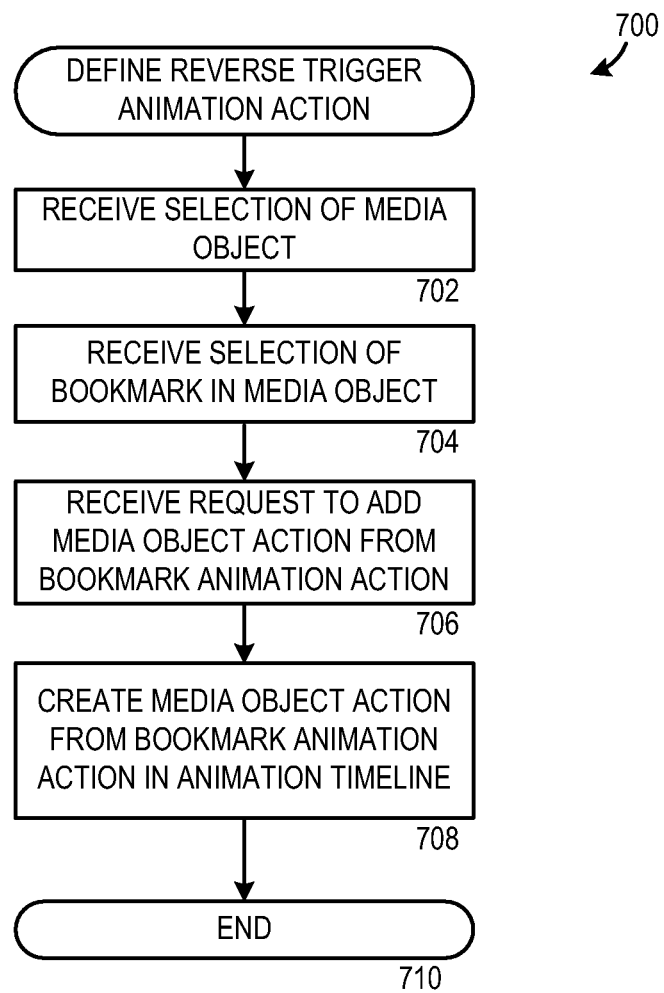
FIGS. 7-8 are flow diagrams showing illustrative processes for defining and executing, respectively, a reverse triggered animation in one embodiment.

Referring now to FIG. 7, additional details will be provided regarding the embodiments presented herein for defining a reverse trigger. In particular, FIG. 7 is a flow diagram showing a routine 700 that illustrates aspects of the operation of an application program for defining a reverse trigger in one implementation presented herein. The routine 700 begins at operation 702, where the selection of a media object, such as the video file 202, is received. Once a media object has been selected, the routine 700 proceeds to operation 704, where a media object action to be performed with respect to the media object and a bookmark are selected. For instance, in the example shown in FIG. 6, the media object action "play at bookmark" has been selected along with one of the two bookmarks 208A-208B defined in the video file 202.

Once the media object action and the bookmark have been defined at operation 704, the routine 700 proceeds to operation 706 where a request is received to add a new reverse trigger to the animation timeline. As discussed above, this request may come in the form of a selection from the drop down menu 602 or another appropriate user interface. In response to the request, the routine 700 proceeds to operation 708, where a new media object action from bookmark animation action is created in the animation timeline. As mentioned above, the new animation action may be identified by a new item 114C in the event list 104 in one embodiment. From operation 708, the routine 700 proceeds to operation 710, where it ends.

Figure 8:
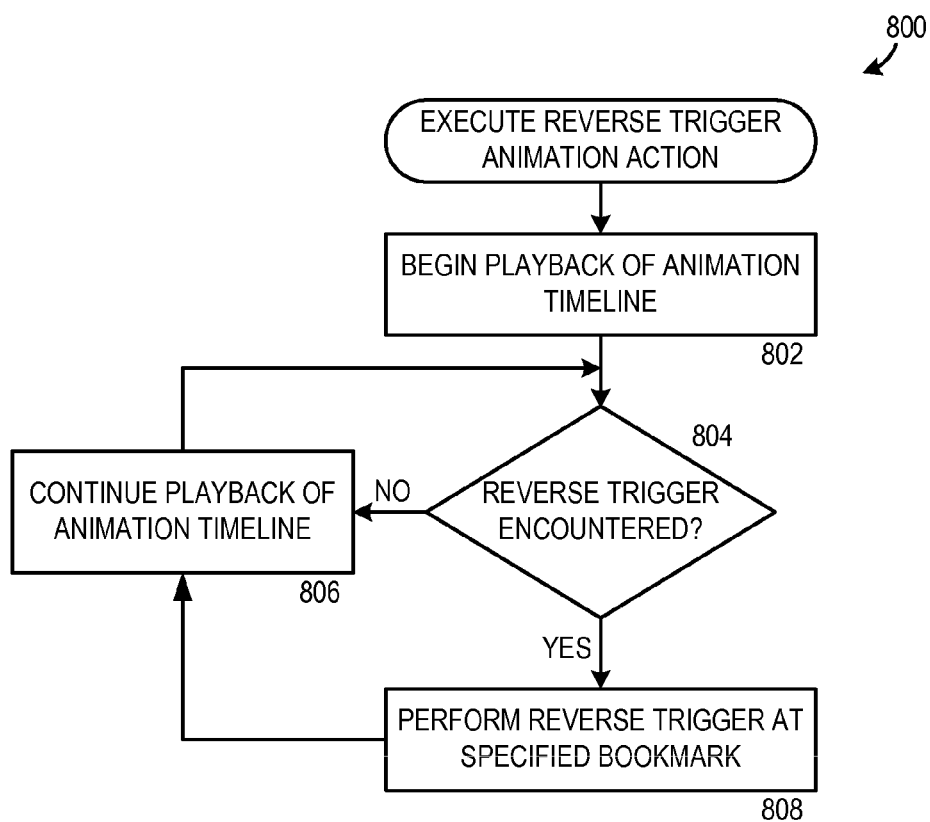

Turning now to FIG. 8, additional details will be provided regarding the embodiments presented herein for executing a reverse trigger. In particular, FIG. 8 is a flow diagram showing a routine 800 that illustrates aspects of the operation of an application program for executing a reverse trigger in one implementation presented herein. The routine 800 begins at operation 802, where playback of the animation timeline defined by the event list 104 begins. From operation 802, the routine 800 proceeds to operation 804, where a determination is made as to whether a reverse trigger has been encountered in the animation timeline defined by the event list 104. If not, the routine 800 proceeds to operation 806, where playback of the animation timeline continues.

If a reverse trigger is identified in the animation timeline defined by the event list 104, the routine 800 proceeds to operation 808, where the media object action specified by the encountered reverse trigger is executed. As mentioned above, a reverse trigger can stop, start, or pause playback of a media object, or perform another action with respect to a media object, at a particular bookmark. From operation 808, the routine 800 proceeds to operation 806, described above.

Figure 9:
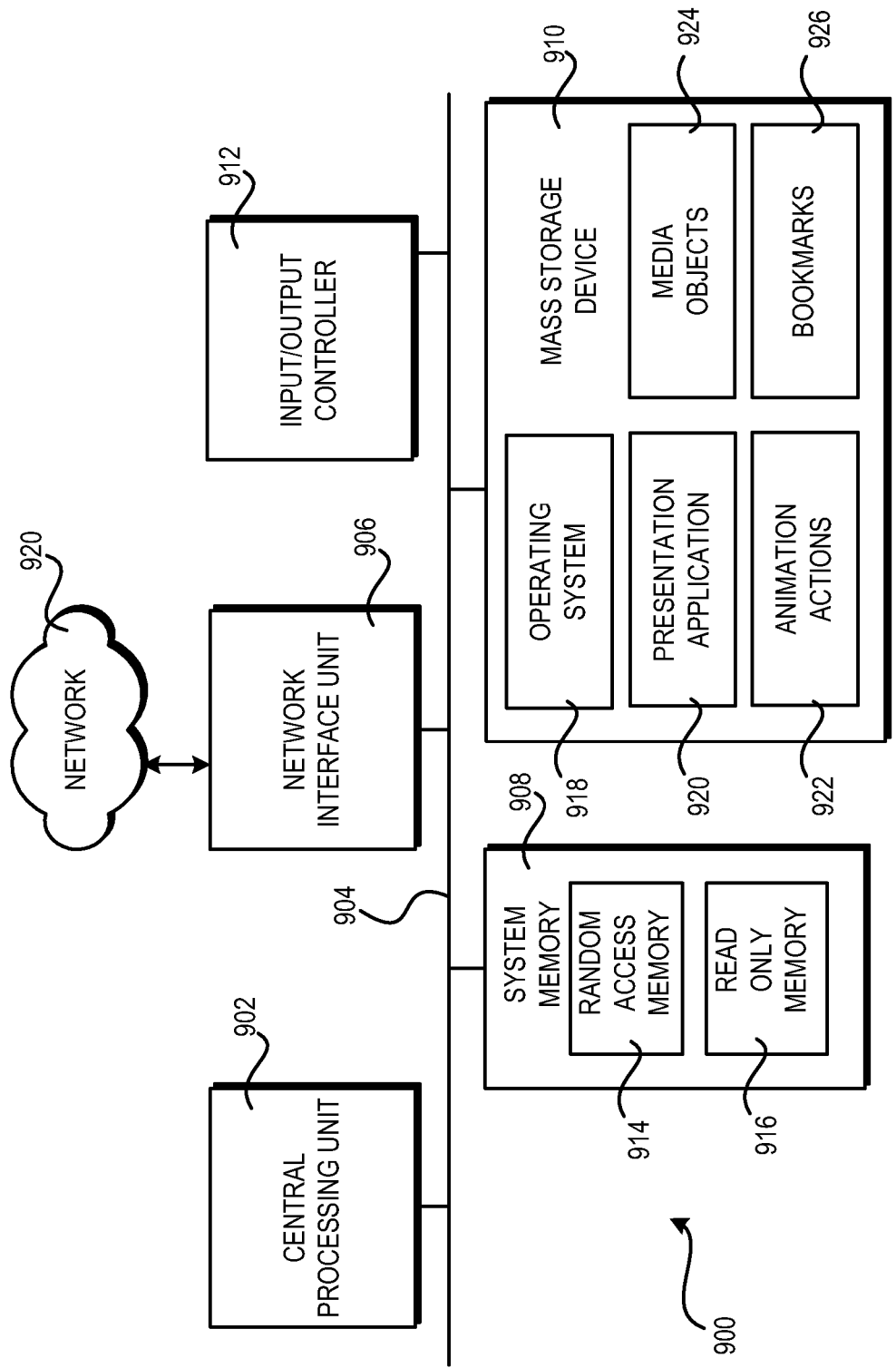
FIG. 9 is a computer architecture diagram showing an illustrative computer hardware and software architecture for a computing system capable of implementing aspects of the embodiments presented herein.

FIG. 9 shows an illustrative computer architecture for a computer 900 capable of executing the software components described herein. The computer architecture shown in FIG. 9 illustrates a conventional desktop, laptop, or server computer and may be utilized to execute any aspects of the software components presented herein.

The computer architecture shown in FIG. 9 includes a central processing unit 902 ("CPU"), a system memory 908, including a random access memory 914 ("RAM") and a read-only memory ("ROM") 916, and a system bus 904 that couples the memory to the CPU 902. A basic input/output system containing the basic routines that help to transfer information between elements within the computer 900, such as during startup, is stored in the ROM 916. The computer 900 further includes a mass storage device 910 for storing an operating system 918, application programs, and other program modules, which have been described in greater detail herein.

The mass storage device 910 is connected to the CPU 902 through a mass storage controller (not shown) connected to the bus 904. The mass storage device 910 and its associated computer-readable media provide non-volatile storage for the computer 900. Although the description of computer-readable media contained herein refers to a mass storage device, such as a hard disk or CD-ROM drive, it should be appreciated by those skilled in the art that computer-readable media can be any available computer storage media that can be accessed by the computer 900.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 900.

According to various embodiments, the computer 900 may operate in a networked environment using logical connections to remote computers through a network such as the network 920. The computer 900 may connect to the network 920 through a network interface unit 906 connected to the bus 904. It should be appreciated that the network interface unit 906 may also be utilized to connect to other types of networks and remote computer systems. The computer 900 may also include an input/output controller 912 for receiving and processing input from a number of other devices, including a keyboard, mouse, or electronic stylus (not shown in FIG. 9). Similarly, an input/output controller may provide output to a display screen, a printer, or other type of output device (also not shown in FIG. 9).

As mentioned briefly above, a number of program modules and data files may be stored in the mass storage device 910 and RAM 914 of the computer 900, including an operating system 918 suitable for controlling the operation of a networked desktop, laptop, or server computer. The mass storage device 910 and RAM 914 may also store one or more program modules. In particular, the mass storage device 910 and the RAM 914 may store a presentation application 920, one or more animation actions 922, media objects 924, and data defining bookmarks 926 within the media objects, each of which was described in detail above with respect to FIGS. 1-8. The mass storage device 910 and the RAM 914 may also store other types of program modules and data.

Based on the foregoing, it should be appreciated that technologies for triggering animation actions and media object actions are provided herein. Although the subject matter presented herein has been described in language specific to computer structural features, methodological acts that include transformations, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for triggering an animation action, the method comprising:

receiving, at a computer system executing a slide show presentation application, a request to trigger an animation action within a slide show presentation created by the slide show presentation application when playback of a media object during viewing of the slide show presentation reaches a bookmark within the media object, the bookmark being specified by a user of the slide show presentation application prior to viewing of the slide show presentation; and in response to receiving the request, storing data defining a new animation timeline associated with the slide show presentation, the new animation timeline being configured to cause the slide show presentation application to determine whether the bookmark has been encountered during playback of the media object during viewing of the slide show presentation, receiving a selection of the animation action, displaying a user interface comprising one or more selectable items, each of the selectable items corresponding to a location within the media object that has been defined with respect to the media object, and receiving a selection of one of the selectable items within the user interface as the bookmark;

in response to encountering the bookmark during playback of the media object, perform the animation action by transforming the data defining the new animation timeline to a visual depiction for display by the computer system;

receiving a second request to add a new animation action to an animation timeline, the new animation action configured to trigger a media object action with respect to an associated media object, wherein the media object action comprises one of an action to stop, start or pause playback of the media object at a specified location within the associated media object of the slide show presentation;

adding the new animation action to the animation timeline in response to the second request; and performing the media object action on the associated media object in response to encountering the new animation action during playback of the animation timeline.

2. A computer-implemented method for triggering a media object action, the method comprising:

receiving, at a computer system executing a slide show presentation application, a request to add an animation action to an animation timeline associated with a slide show presentation created by the slide show presentation application, the animation action configured to trigger the media object action at a specified location within an associated media object of the slide show presentation, the animation action being specified by a user of the slide show presentation application prior to viewing of the slide show presentation;

adding the animation action to the animation timeline in response to the request, wherein the animation timeline is configured to cause the slide show presentation application presenting the slide show presentation to determine, during viewing of the slide show presentation, if the animation action has been encountered, and performing the media object action on the associated media object in response to encountering the animation action during playback of the animation timeline within the slide show presentation, the media object action comprises an action to one of stop, start or pause playback of the associated media object at the specified location within the associated media object of the slide show presentation.

3. The method of claim 2, further comprising:

receiving a request to trigger a second animation action when playback of the media object reaches a second location within the associated media object of the slide show presentation;

in response to receiving the request, creating a new animation timeline that is configured to perform the second animation action when the playback of the media object reaches the second location within the associated media object of the slide show presentation;

determining whether the second location within the associated media object of the slide show presentation has been encountered during playback of the media object; and performing the second animation action in response to encountering the second location within the associated media object of the slide show presentation during playback of the media object.

4. The method of claim 3, wherein receiving the request to trigger the second animation action when playback of the media object reaches the second location within the associated media object of the slide show presentation comprises:
receiving a selection of the animation action;
displaying a user interface comprising one or more selectable items, each of the selectable items corresponding to a point location within the associated media object of the slide show presentation that has been defined with respect to the media object; and
receiving a selection of one of the items within the user interface as the second location within the associated media object of the slide show presentation.

5. The method of claim 4, wherein the points of interest comprise bookmarks.

6. The method of claim 5, wherein the media object comprises a video file.

7. A computer-readable medium having computer-executable instructions stored thereon which, when executed by a computer, cause the computer to:
receive a request to trigger an animation action when playback of a media object by a slide show presentation created by a slide show presentation application reaches a location specified by a user of the slide show presentation application;
in response to receiving the request,
store data defining a new animation timeline associated with the slide show presentation, the new animation timeline being configured to cause the computer to perform the animation action when the playback of the media object by the slide show presentation reaches the specified location,
receive a selection of the animation action,
display a user interface comprising one or more selectable items, each of the selectable items corresponding to a location within the media object that has been defined with respect to the media object, and
receive a selection of one of the selectable items within the user interface as a bookmark;
present the slide show presentation;
begin playback of the media object during presentation of the slide show presentation based, at least partially, upon the new animation timeline;
determine whether the specified location has been encountered during playback of the media object;
perform the animation action in response to encountering the specified location during playback of the media object;
receiving a second request to add a new animation action to an animation timeline, the new animation action configured to trigger a media object action with respect to an associated media object, wherein the media object action comprises one of an action to stop, start or pause playback of the associated media object at a specified location within the associated media object of the slide show presentation;
adding the animation action to the animation timeline in response to the request; and
performing the media object action on the associated media object in response to encountering the new animation action during playback of the animation timeline.

8. The method of claim 1, wherein the request to trigger the animation action comprises a first request for a forward trigger and a second request for a reverse trigger, the forward trigger comprising a trigger for an animation action in response to reaching a specified location during playback of the media object, and the reverse trigger comprising a further trigger for an animation action triggered in response to reaching a specified location in the animation timeline.

* * * * *